United States Patent
Romelfanger et al.

(10) Patent No.: US 10,493,882 B1
(45) Date of Patent: Dec. 3, 2019

(54) VEHICLE SEATBACK WITH THORACIC SUPPORT ACTUATED PILLOW

(71) Applicant: Ford Global Technologies, LLC, Dearborn, MI (US)

(72) Inventors: Megan Romelfanger, Ferndale, MI (US); Timothy Hamlin, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/991,007

(22) Filed: May 29, 2018

(51) Int. Cl.
*B60N 2/22* (2006.01)
*B60N 2/58* (2006.01)
*B60N 2/64* (2006.01)
*B60N 2/68* (2006.01)
*B60N 2/70* (2006.01)
*B60N 2/02* (2006.01)

(52) U.S. Cl.
CPC .......... *B60N 2/643* (2013.01); *B60N 2/0252* (2013.01); *B60N 2/2222* (2013.01); *B60N 2/0232* (2013.01); *B60N 2/68* (2013.01)

(58) Field of Classification Search
CPC ...... B60N 2/68; B60N 2/0232; B60N 2/2222; B60N 2/0252; B60N 2/643
USPC ............. 297/284.1, 284.3, 354.11, 410, 408, 297/284.2, 284.6, 391, 397, 452.41
See application file for complete search history.

(56) References Cited

U.S. PATENT DOCUMENTS

| | | | | |
|---|---|---|---|---|
| 2,869,622 | A * | 1/1959 | Petersen | A47C 7/38 297/396 |
| 4,693,515 | A * | 9/1987 | Russo | B60N 2/838 297/284.1 |
| 4,890,885 | A * | 1/1990 | Grossmann | A47C 27/086 297/284.1 |
| 5,174,526 | A | 12/1992 | Kanigowski | |
| 5,364,164 | A * | 11/1994 | Kuranami | A47C 7/38 297/408 |
| 5,664,841 | A * | 9/1997 | Dal Monte | B60N 2/62 297/408 |
| 5,772,281 | A * | 6/1998 | Massara | B60N 2/643 297/284.6 X |
| 6,203,105 | B1 * | 3/2001 | Rhodes, Jr. | A47C 4/54 297/284.6 |
| 6,250,716 | B1 * | 6/2001 | Clough | A47C 7/383 297/408 |
| 6,334,651 | B1 | 1/2002 | Duan et al. | |
| 6,511,130 | B2 * | 1/2003 | Dinkel | B60N 2/809 297/410 |
| 6,530,622 | B1 * | 3/2003 | Ekern | B60N 2/2222 297/284.1 |

(Continued)

Primary Examiner — Rodney B White
(74) Attorney, Agent, or Firm — Vichit Chea; Price Heneveld LLP (57) ABSTRACT

A vehicle seating assembly is provided herein. The vehicle seating assembly includes a seat-base. A seatback is pivotally coupled to the seat-base and includes a seatback frame. An upper thoracic support is operably coupled to the seatback frame. The upper thoracic support is configured to move outward from the seatback frame from a stowed position to a deployed position. An actuatable comfort feature is coupled to the upper thoracic support and is configured to extend outward from the upper thoracic support from a retracted position to an extended position.

20 Claims, 6 Drawing Sheets

(56) References Cited

U.S. PATENT DOCUMENTS

| | | | |
|---|---|---|---|
| 6,550,856 B1 * | 4/2003 | Ganser | B60N 2/20 297/284.1 X |
| 6,679,557 B2 * | 1/2004 | Craft | A47C 7/467 297/452.41 X |
| 6,962,392 B2 | 11/2005 | O'Connor | |
| 7,040,705 B2 * | 5/2006 | Clough | A47C 7/38 297/408 X |
| 7,364,239 B2 * | 4/2008 | Clough | A47C 7/38 297/408 X |
| 7,992,933 B2 * | 8/2011 | Yetukuri | B60N 2/4228 297/216.12 |
| 8,033,610 B2 * | 10/2011 | Graber | B60N 2/2222 297/284.1 |
| 8,840,185 B2 * | 9/2014 | Worlitz | B60N 2/80 297/284.1 |
| 9,126,508 B2 * | 9/2015 | Line | B60N 2/2222 |
| 9,409,504 B2 * | 8/2016 | Line | B60N 2/64 |
| 9,707,870 B2 * | 7/2017 | Line | B60N 2/64 |
| 9,707,873 B2 * | 7/2017 | Line | B60N 2/643 |
| 9,776,533 B2 * | 10/2017 | Line | B60N 2/2222 |
| 9,809,131 B2 * | 11/2017 | Line | B60N 2/0232 |
| 9,889,773 B2 | 2/2018 | Line et al. | |
| 9,914,378 B1 * | 3/2018 | Line | B60N 2/2222 |
| 10,166,900 B2 * | 1/2019 | Line | B60N 2/643 |
| 2002/0163233 A1 * | 11/2002 | Craft | A47C 7/467 297/284.1 |
| 2003/0025370 A1 * | 2/2003 | Hensel | A47C 7/38 297/285 |
| 2005/0140193 A1 * | 6/2005 | Skelly | A47C 7/503 297/284.9 |
| 2012/0080927 A1 * | 4/2012 | Lohmann | B60N 2/3009 297/410 |
| 2016/0096448 A1 * | 4/2016 | Line | B60N 2/2222 297/354.11 |
| 2016/0096449 A1 * | 4/2016 | Line | B60N 2/2222 297/354.11 |
| 2018/0009339 A1 * | 1/2018 | Durkee | B60N 2/3011 |
| 2018/0178696 A1 * | 6/2018 | Dexter | B60N 2/821 |

* cited by examiner

VEHICLE SEATBACK WITH THORACIC SUPPORT ACTUATED PILLOW

FIELD OF THE INVENTION

The present invention generally relates to a vehicle seating assembly, and more particularly to a seatback having an upper thoracic support and an actuatable comfort feature.

BACKGROUND OF THE INVENTION

Seating assemblies for vehicles typically include a seatback to support the back of an occupant in an upright seated position and various reclined positions. Seatbacks of these vehicle seating assemblies are commonly designed to support an occupant upon acceleration, change in direction, and collision of the vehicle, such that the seatbacks are substantially rigid in construction and lack adequate adjustment features.

SUMMARY OF THE INVENTION

According to one aspect of the present invention, a vehicle seating assembly includes a seat-base. A seatback is pivotally coupled to the seat-base and includes a seatback frame. An upper thoracic support is operably coupled to the seatback frame. The upper thoracic support is configured to move outward from the seatback frame from a stowed position to a deployed position. An actuatable comfort feature is coupled to the upper thoracic support and is configured to extend outward from the upper thoracic support from a retracted position to an extended position.

Embodiments of the first aspect of the invention can include any one or a combination of the following features:
  the actuatable comfort feature is coupled to the upper thoracic support such that the actuatable comfort feature is configured to move from the retracted position to the extended position as the upper thoracic support moves from the stowed position to the deployed position;
  the actuatable comfort feature is configured to protrude outward from the upper thoracic support a first distance while in the retracted position and a second distance while in the extended position, wherein the second distance is greater than the first distance;
  the actuatable comfort feature comprises a flexible member configured to be generally flat while in the retracted position and generally bowed while in the extended position;
  the flexible member comprises a plastic sheet;
  the upper thoracic support is pivotally coupled to the seatback frame and configured to pivot outward from the seatback frame from the stowed position to the deployed position; and
  the upper thoracic support is configured to pivot toward the seat-base as the upper thoracic support moves from the stowed position to the deployed position.

According to another aspect of the present invention, a vehicle seating assembly includes a seat-base. A seatback is pivotally coupled to the seat-base. The seatback includes a seatback frame. An upper thoracic support is coupled to the seatback frame and is operable to pivot toward the seat-base from a stowed position to a deployed position. An actuatable comfort feature is coupled to the upper thoracic support and is configured to extend outward therefrom from a retracted position to an extended position.

Embodiments of the second aspect of the invention can include any one or a combination of the following features:
  the actuatable comfort feature is coupled to the upper thoracic support such that the actuatable comfort feature is configured to move from the retracted position to the extended position as the upper thoracic support pivots from the stowed position to the deployed position;
  the actuatable comfort feature is configured to protrude outward from the upper thoracic support a first distance while in the retracted position and a second distance while in the extended position, wherein the second distance is greater than the first distance;
  the actuatable comfort feature comprises a flexible member configured to be generally flat while in the retracted position and generally bowed while in the extended position;
  the flexible member comprises a plastic sheet; and
  the actuatable comfort feature comprises a bladder configured to expand from the retracted position to the extended position.

According to yet another aspect of the present disclosure, a vehicle seating assembly includes a seatback frame. An upper thoracic support is pivotally coupled to the seatback frame and is operable between stowed and deployed positions. A gap is defined between the upper thoracic support and the seatback frame. The gap enlarges when the upper thoracic support moves from the stowed position to the deployed position. An actuatable comfort feature is coupled to the upper thoracic support and is operable between a retracted position and an extended position.

Embodiments of the third aspect of the invention can include any one or a combination of the following features:
  the actuatable comfort feature is coupled to the upper thoracic support such that the actuatable comfort feature is configured to move from the retracted position to the extended position as the upper thoracic support pivots from the stowed position to the deployed position;
  the actuatable comfort feature is configured to protrude outward from the upper thoracic support a first distance while in the retracted position and a second distance while in the extended position, wherein the second distance is greater than the first distance;
  the actuatable comfort feature comprises a flexible member configured to be generally flat while in the retracted position and generally bowed while in the extended position;
  the flexible member comprises a plastic sheet;
  the actuatable comfort feature comprises a bladder configured to expand from the retracted position to the extended position; and
  the seatback frame further comprises a mid-portion and the upper thoracic support is pivotally coupled to the mid-portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In reference to FIGS. 1-7B, a vehicle 10 is disclosed. The vehicle 10 includes a seating assembly 14. The seating assembly 14 includes a seat-base 18. A seatback 22 is pivotally coupled to the seat-base 18 and includes a seatback frame 24. An upper thoracic support 26 is operably coupled to the seatback frame 24. The upper thoracic support 26 is configured to move outward from the seatback frame 24 from a stowed position to a deployed position. An actuatable comfort feature 34 is coupled to the upper thoracic support 26 and is configured to extend outward from the upper thoracic support 26 from a retracted position to an extended position.

Figures 1, 2:
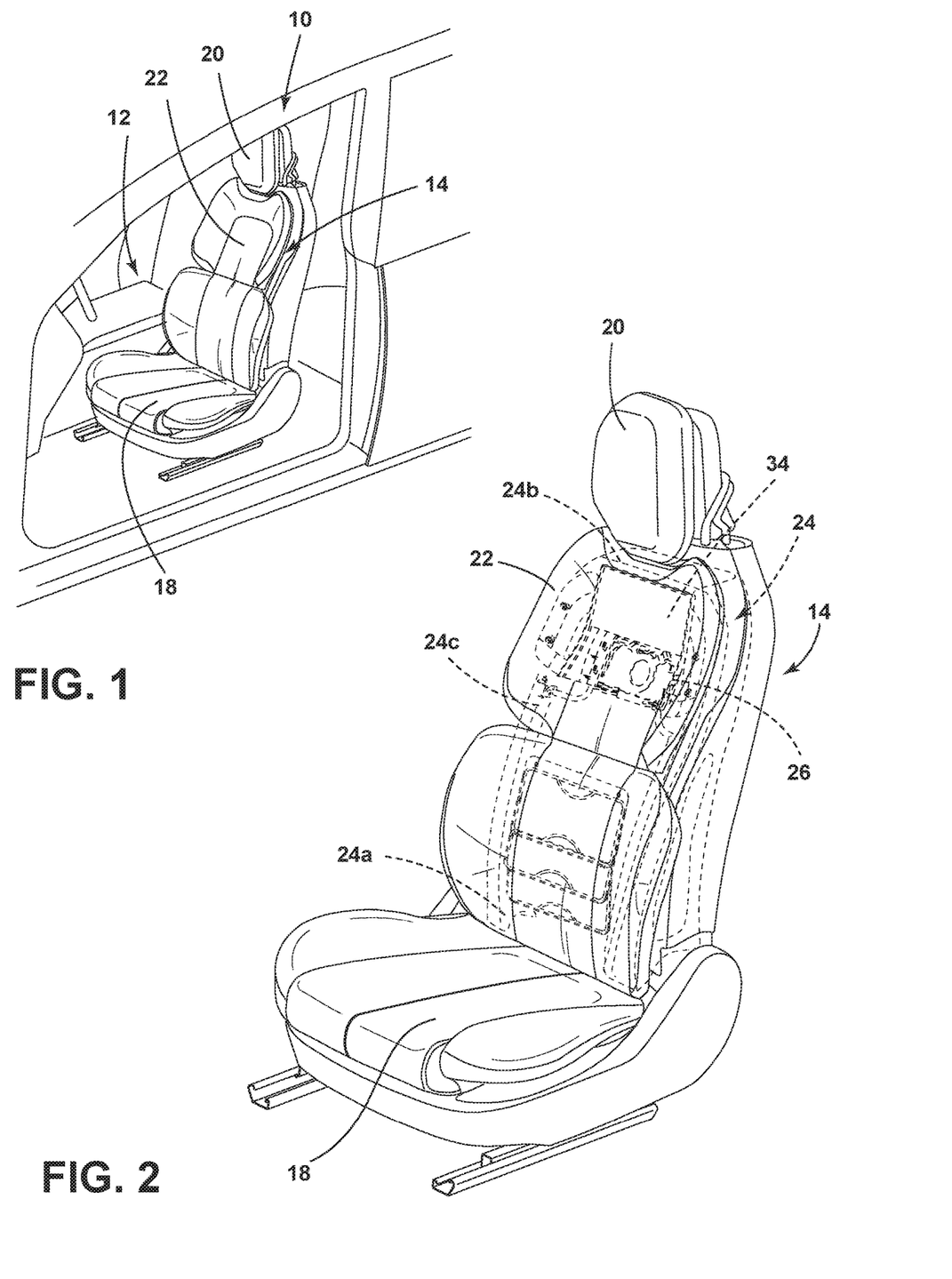
FIG. 1 is a top perspective view of a vehicle seating assembly in a vehicle, according to one embodiment.
FIG. 2 is a top perspective view of the vehicle seating assembly, illustrating a seatback frame in phantom, according to one embodiment.

Referring now to FIG. 1, the vehicle 10 is depicted. It is contemplated that the vehicle 10 may be at least one of a variety of vehicle types (e.g., van, truck, sedan, SUV, etc.). The vehicle 10 includes a vehicle interior 12. The vehicle interior 12 includes the seating assembly 14. In various embodiments, the seating assembly 14 may move in vehicle forward and rearward directions. For example, the seating assembly 14 may move vehicle forward and rearward in a conventional manner by sliding along rail slides. In some embodiments, the seating assembly 14 may move in various directions within the vehicle interior 12 and/or rotate or swivel relative to the vehicle interior 12, such that the seating assembly 14 may face various vehicular directions. It is contemplated that the vehicle 10 may include a plurality of seating assemblies 14.

Referring now to FIGS. 1 and 2, the seating assembly 14 may include the seat-base 18. The seatback 22 is coupled to the seat-base 18. In various embodiments, the seatback 22 may be pivotally coupled with the seat-base 18 to allow for a variety of reclined positions relative to the seat-base 18. In some embodiments, the seating assembly 14 may include a headrest 20. It is contemplated that the headrest 20 may be coupled to the seatback 22 and/or integral with the seatback 22.

As shown in FIG. 2, the seatback 22 may include the seatback frame 24. In some embodiments, the seatback frame 24 may be coupled and/or pivotally coupled to the seat-base 18 and/or a portion of the seat-base 18. The seatback frame 24 may include a proximal-portion 24a. The proximal-portion 24a may be a region of the seatback frame 24 nearest to the seat-base 18. The seatback frame 24 may include a distal-portion 24b. The distal-portion 24b may be the region of the seatback frame 24 that is furthest from the seat-base 18. The seatback frame 24 may include a mid-portion 24c. The mid-portion 24c may generally be the region of the seatback frame 24 between the proximal-portion 24a and the distal-portion 24b. It is contemplated that the proximal-portion 24a, the distal-portion 24b, and the mid-portion 24c may encompass different amounts of the seatback frame 24 in different embodiments. For example, in one embodiment, the proximal-portion 24a and distal-portion 24b may each include about a quarter of the seatback frame 24, respectively, and the mid-portion 24c may include the remaining half of the seatback frame 24; while, in another embodiment, the proximal-portion 24a, the distal-portion 24b, and the mid-portion 24c may each encompass respective approximate thirds of the seatback frame 24.

Figure 3A:
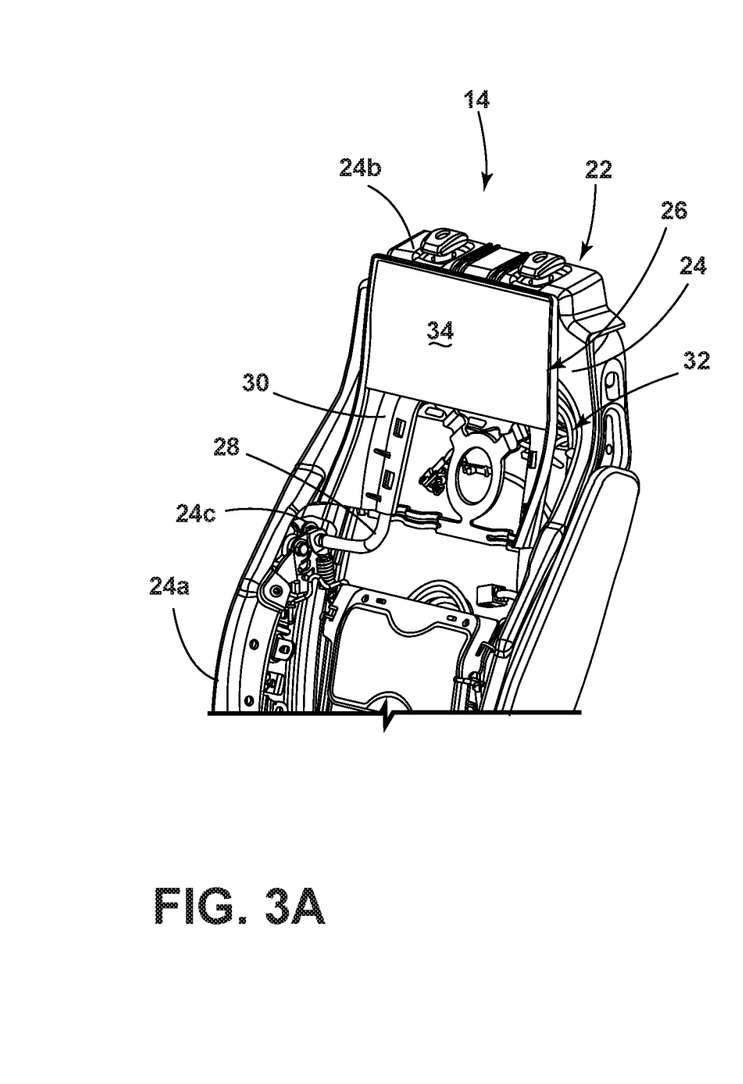
FIG. 3A is a side perspective view of the seatback frame, illustrating an upper thoracic support in a stowed position, according to one embodiment.
Figure 3B:
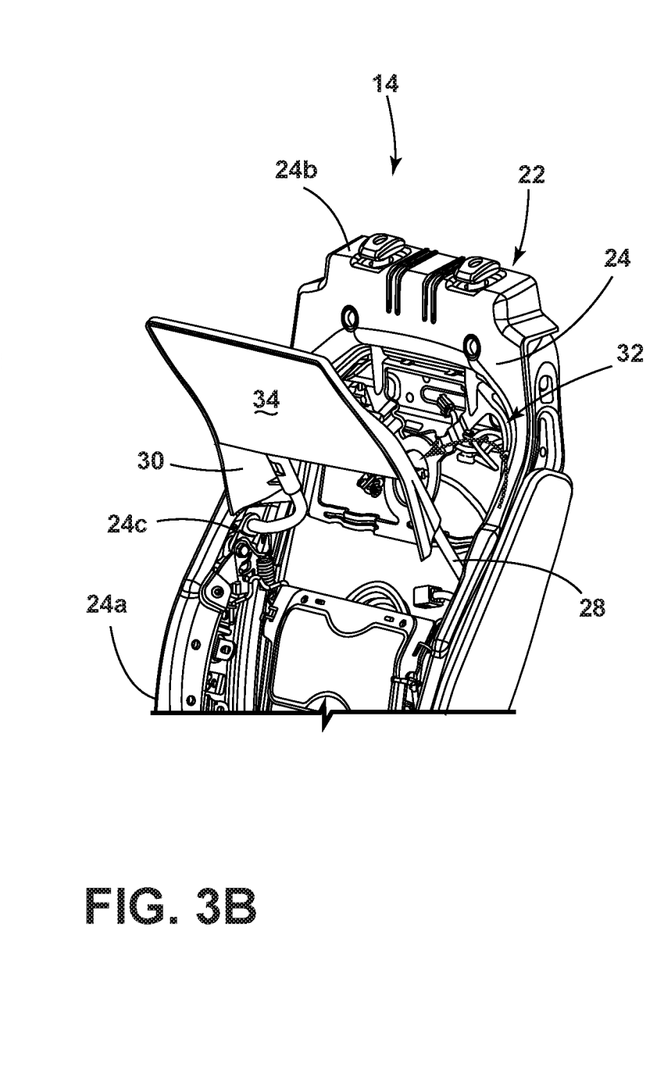
FIG. 3B is a side perspective view of the seatback frame, illustrating the upper thoracic support in a deployed position, according to one embodiment.

Referring now to FIGS. 3A and 3B, the upper thoracic support 26 may be coupled to the seatback frame 24. In some embodiments, the upper thoracic support 26 may be coupled to the mid-portion 24c of the seatback frame 24. In some embodiments, the upper thoracic support 26 may be pivotally coupled to the seatback frame 24 and/or the mid-portion 24c of the seatback frame 24.

The upper thoracic support 26 in FIG. 3A is generally depicted as having a generally rectangular outer periphery and a generally U-shaped inner periphery, however, it is contemplated that the upper thoracic support 26 may be a variety of shapes. In some embodiments, the upper thoracic support 26 may include a plurality of components. For example, as shown in FIGS. 3A and 3B, the upper thoracic support 26 may include an inverted U-shaped tube 28 and an outer flange 30 that is coupled to, and extends laterally and upwardly from, the U-shaped tube 28. In some embodiments, the U-shaped tube 28 and the outer flange 30 may be configured to provide some degree of flexure relative to the seatback frame 24, such that the upper thoracic support 26 may flex rearward in a cantilevered manner. It is contemplated that, in some embodiments, the upper thoracic portion 26 may be composed of a single integral component. It is further contemplated that the upper thoracic support 26 and/or the individual components of the upper thoracic support 26 may be composed of at least one of a host of materials that includes, but is not limited to, metal, plastic, rubber, ceramics, natural materials, woven materials, polymers, foams, and/or a combination thereof.

As depicted in FIGS. 3A and 3B, in various embodiments, the upper thoracic support 26 may be operable to move between a stowed position and a deployed position. In some embodiments, the upper thoracic support 26 may move between the stowed position and the deployed position by pivoting relative to the seatback frame 24. In some embodiments, the upper thoracic support 26 may move outward from the seatback frame 24 as it pivots from the stowed position to the deployed position. Reciprocally, the upper thoracic support 26 may move inward toward the seatback frame 24 as it pivots from the deployed position to the stowed position. In some embodiments, the upper thoracic support 26 may become nearer to perpendicular relative to the seatback frame 24 as the upper thoracic support 26 moves from the stowed position to the deployed position. In some embodiments, the upper thoracic support 26 may pivot toward the seat-base 18 as it moves from the stowed position to the deployed position.

Referring further to FIGS. 3A and 3B, a gap 32 between the seatback frame 24 and the upper thoracic support 26 may be defined by the upper thoracic support 26 and the seatback frame 24. As depicted in FIGS. 3A and 3B, in some embodiments, the gap 32 may enlarge as the upper thoracic support 26 pivots from the stowed position to the deployed position. Reciprocally, the gap 32 may decrease in size as the upper thoracic support 26 pivots from the deployed position to the stowed position.

It is contemplated that the functionality associated with the upper thoracic support 26 may be manually adjusted and/or adjusted via a motorized system disposed inside the seating assembly 14. In some embodiments, the upper thoracic support 26 may be configured to adjust as a result of the seatback 22 pivoting relative to the seat-base 18. For example, the upper thoracic support 26 may pivot from the stowed position to the deployed position in response to the seatback 22 pivoting from an upright position to a reclined position. It is further contemplated that the upper thoracic support 26 may be retained in the stowed position, deployed position, and/or there between by at least one of a host of features that includes, but is not limited to, a detent, a stop, a spring, a ratchet, frictional engagement, and/or a combination thereof.

Figure 4A:
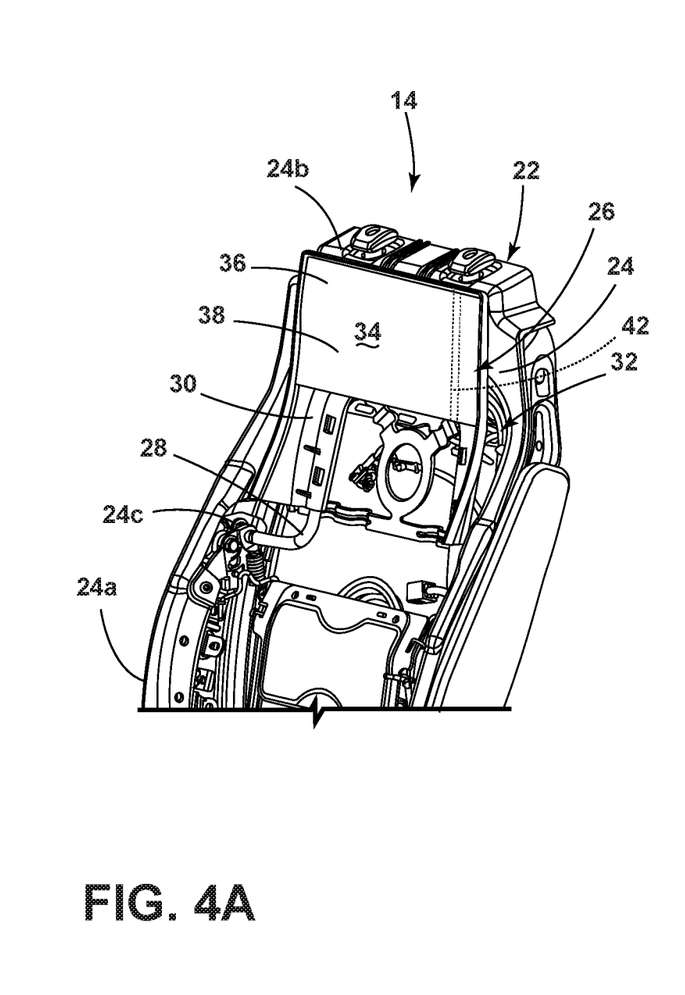
FIG. 4A is an enhanced side perspective view of the seatback frame, illustrating an actuatable comfort feature in a retracted position, according to one embodiment.
Figure 4B:
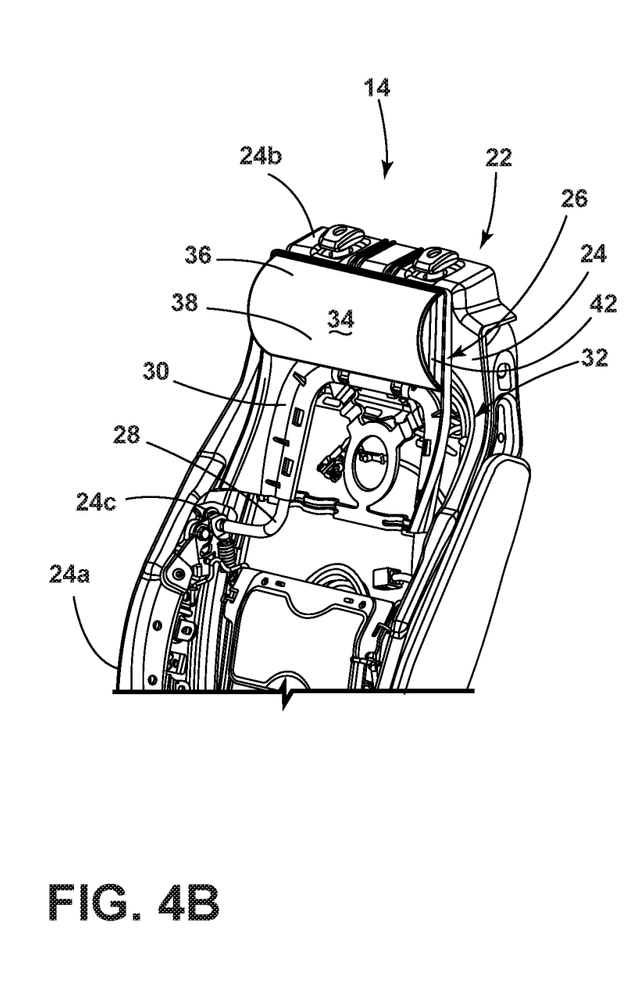
FIG. 4B is an enhanced side perspective view of the seatback frame, illustrating the actuatable comfort feature in an extended position, according to one embodiment.
Figure 5A:
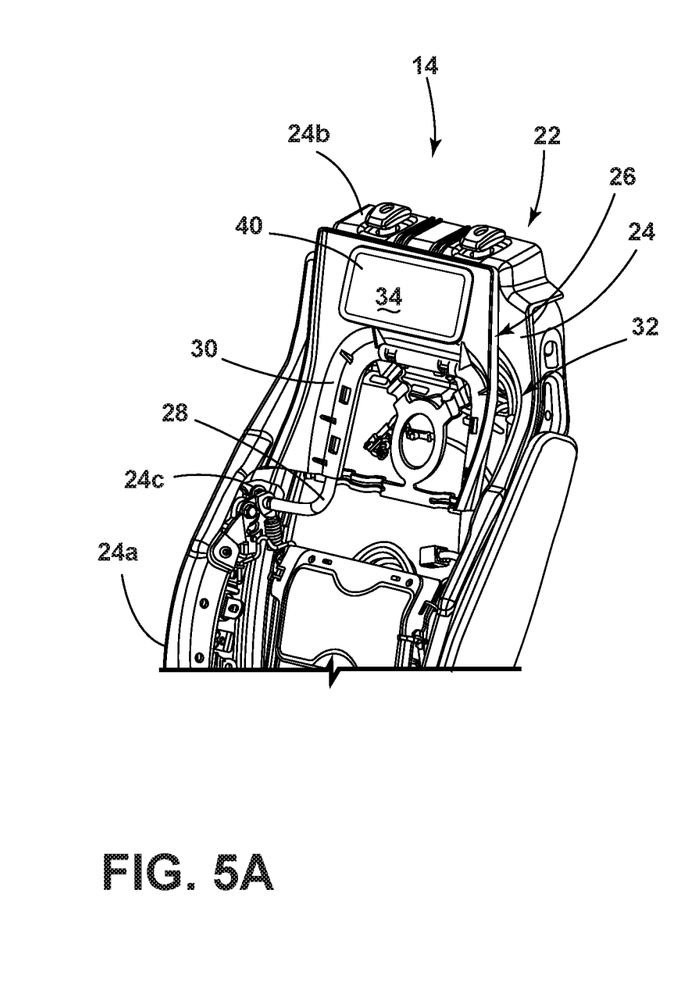
FIG. 5A is a side perspective view of the seatback frame, illustrating the actuatable comfort feature, depicted as a bladder, in the retracted position, according to one embodiment.
Figure 5B:
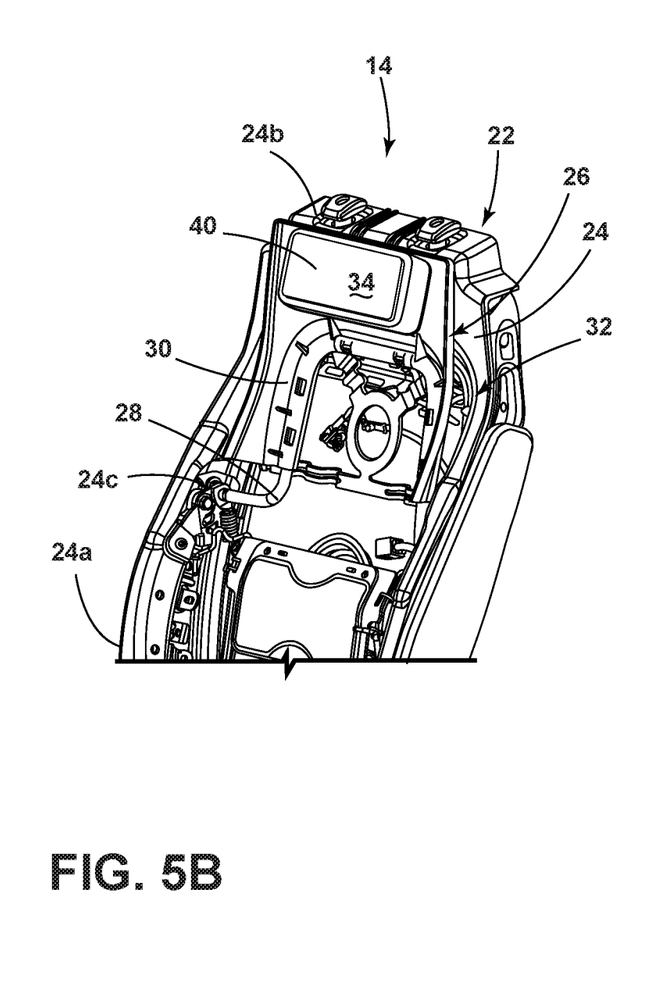
FIG. 5B is a side perspective view of the seatback frame, illustrating the actuatable comfort feature, depicted as the bladder, in the extended position, according to one embodiment.

Referring now to FIGS. 4A-5B, the actuatable comfort feature 34 may be coupled to the upper thoracic support 26. The actuatable comfort feature 34 may include a flexible member 36, as shown in FIGS. 4A and 4B. In some embodiments, the flexible member 36 may include a plastic sheet 38. In some embodiments, the actuatable comfort feature 34 may include a bladder 40, as shown in FIGS. 5A and 5B. It is contemplated that the actuatable comfort feature 34 may include various features suitable for providing comfort to a seat occupant.

In various embodiments, the actuatable comfort feature 34 may be operable between a retracted position and an extended position. The actuatable comfort feature 34 may be configured to extend outward from the upper thoracic support 26 as it moves from the retracted position to the extended position. In some embodiments, the actuatable comfort feature 34 may be configured to protrude outward from the upper thoracic support 26 a first distance while in the retracted position, as shown in FIGS. 4A and 5A, and a second distance while in the extended position, as shown in FIGS. 4B and 5B, wherein the second distance is greater than the first distance.

Referring now to FIGS. 4A and 4B, wherein the actuatable comfort feature 34 includes the flexible member 36, the flexible member 36 may be configured to be generally flat while the actuatable comfort feature 34 is in the retracted position and generally bowed outward from the upper thoracic support 26 while the actuatable comfort feature 34 is in the extended position. In some embodiments, the flexible member 36 may become bowed by actuation of a tensioning feature 42 (e.g., cable, spring, etc.) coupled to the flexible member 36. Actuation of the tensioning feature 42 may cause at least one end of the flexible member 36 to move toward the opposite end of the flexible member 36, which, in turn, causes the flexible member 36 to bow outward. This is depicted in FIG. 4B, in which the tensioning feature 42 is actuated such that it moves the lower end of the flexible member 36 towards the upper end of the flexible member 36. It is contemplated that, in various embodiments, the tensioning feature 42 may be manually actuated and/or actuated via a motorized system disposed inside the seating assembly 14. It will be understood that, in various embodiments, the flexible member 36 may become bowed as the actuatable comfort feature 34 moves from the retracted position to the extended position in various others ways known to a person having ordinary skill in the art.

Referring now to FIGS. 5A and 5B, wherein the actuatable comfort feature 34 includes the bladder 40, the bladder 40 may be configured to expand as the actuatable comfort feature 34 moves from the retracted position to the extended position. Reciprocally, the bladder 40 may be configured to contract as the actuatable comfort feature 34 moves from the extended position to the retracted position. In various embodiments, the bladder 40 may expand by being at least partially filled with air and/or another suitable fluid. It will be understood that, in various embodiments, the functionality associated with the bladder 40 may be manually adjusted and/or adjusted via a motorized system disposed within the vehicle interior 12.

Figure 6A:
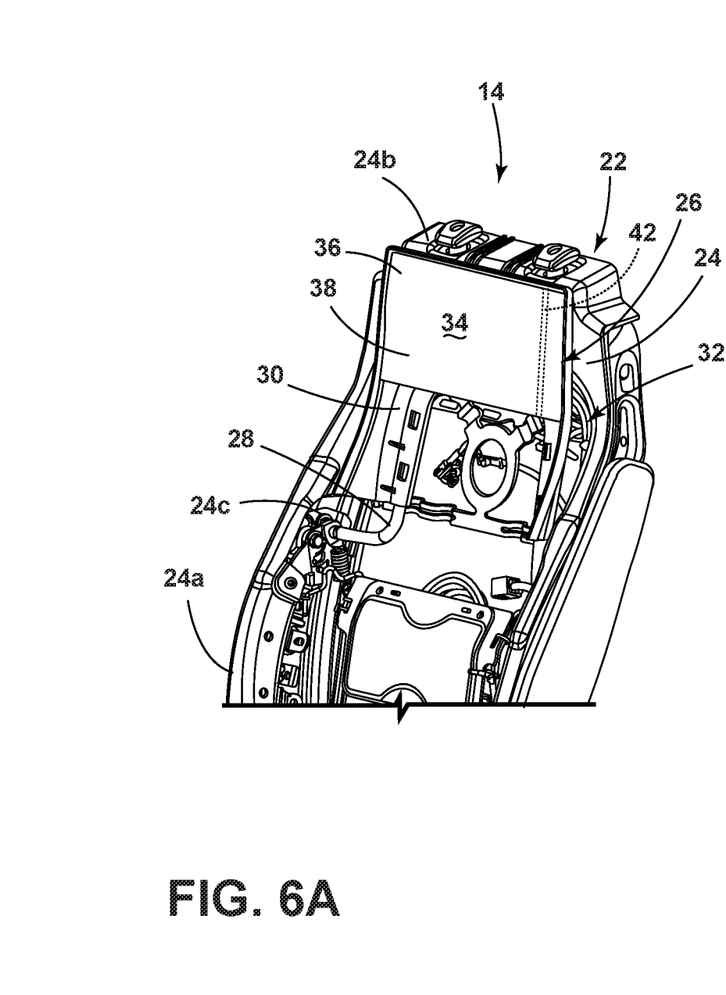
FIG. 6A is a side perspective view of the seatback frame, illustrating the upper thoracic support in the stowed position and the actuatable comfort feature in the retracted position, according to one embodiment.
Figure 6B:
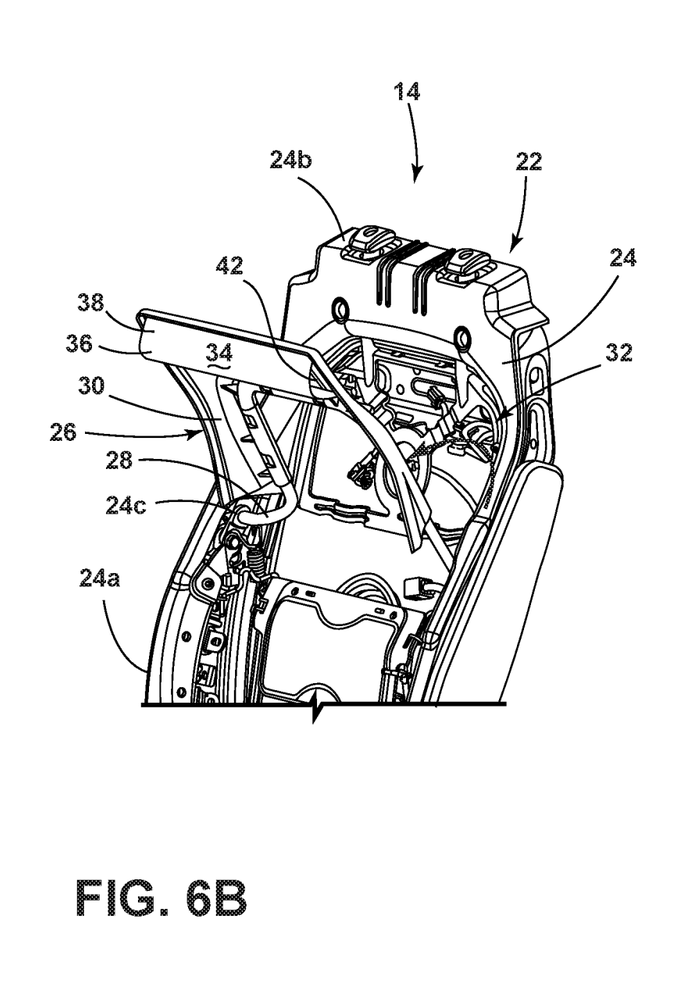
FIG. 6B is a side perspective view of the seatback frame, illustrating the upper thoracic support in the deployed position and the actuatable comfort feature in the extended position, according to one embodiment.

In reference to FIGS. 6A and 6B, the operation of the actuatable comfort feature 34 may be linked to the operation of the upper thoracic support 26. In some embodiments, the actuatable comfort feature 34 may be coupled to the upper thoracic support 26 such that the actuatable comfort feature 34 is configured to move from the retracted position to the extended position as the upper thoracic support 26 pivots from the stowed position to the deployed position. Reciprocally, the actuatable comfort feature 34 may be configured to move from the extended position to the retracted position as the upper thoracic support 26 pivots from the deployed position to the stowed position.

In various embodiments, movement of the upper thoracic support 26 from the stowed position to the deployed position may mechanically prompt the actuatable comfort feature 34 to move from the retracted position to the extended position. For example, in some embodiments, movement of the upper thoracic support 26 from the stowed position to the deployed position may physically induce actuation of the tensioning feature 42, which, in turn, causes the flexible member 36 to bow outward from the upper thoracic support 26, resulting in the actuatable comfort feature 34 moving from the retracted position to the extended position. It is contemplated that, in some embodiments in which the upper thoracic support 26 and/or the actuatable comfort feature 34 are adjusted via a motorized system, a controller may prompt the motorized system to move the actuatable comfort feature 34 from the retracted position to the extended position as the upper thoracic support 26 moves from the stowed position to the deployed position.

Figure 7A:
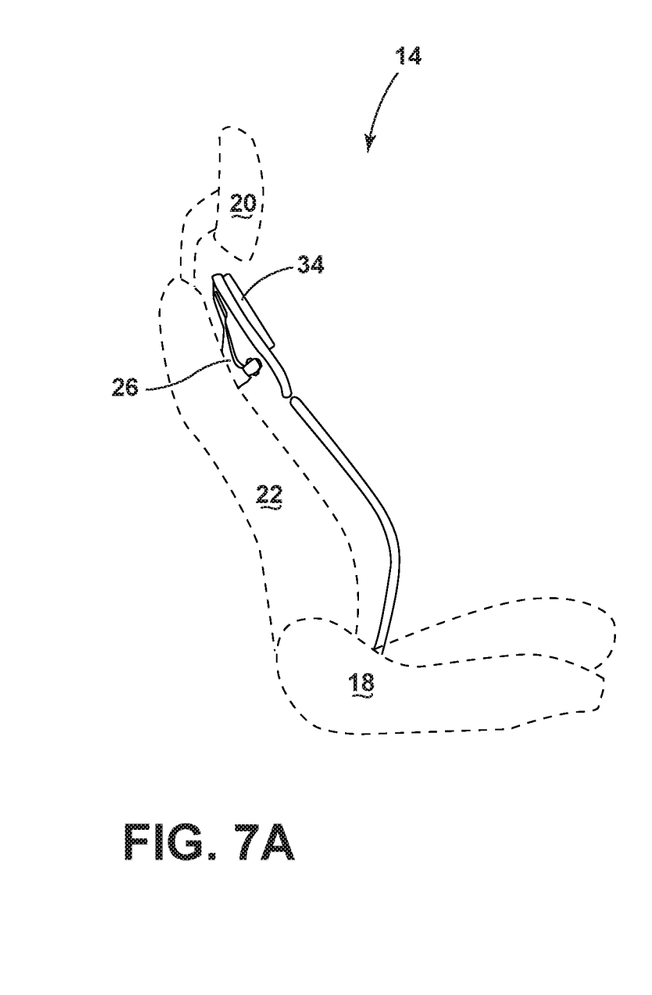
FIG. 7A is a side view of the vehicle seating assembly, illustrating a seatback in an upright position in phantom, the upper thoracic support in the stowed position, and the actuatable comfort feature in the retracted position, according to one embodiment.
Figure 7B:
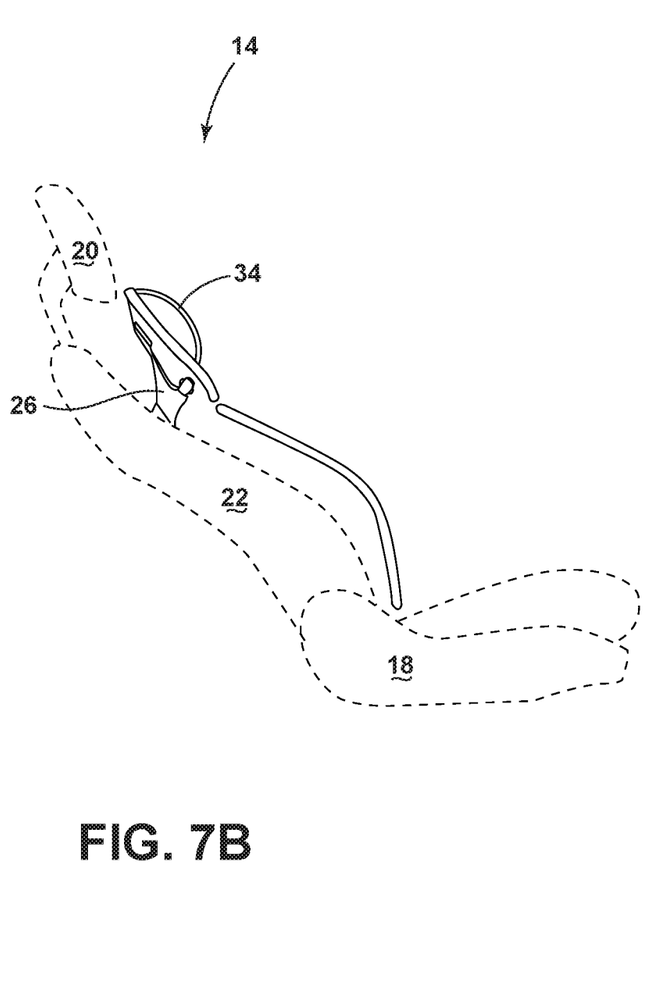
FIG. 7B is a side view of the vehicle seating assembly, illustrating the seatback in a reclined position in phantom, the upper thoracic support in the deployed position, and the actuatable comfort feature in the extended position, according to one embodiment.

Referring now to FIGS. 7A and 7B, in operation, a seat occupant may adjust the seating assembly 14 by pivoting the seatback 22 relative to the seat-base 18, moving the upper thoracic support 26 between the stowed position and the deployed position, and/or moving the actuatable comfort feature 34 between the retracted position and the extended position. For example, an occupant desiring to sit in an upright position may position (1) the seatback 22 in an upright position relative to the seat-base 18, (2) the upper thoracic support 26 in the stowed position, and (3) the actuatable comfort feature 34 in the retracted position, as shown in FIG. 7A. Upon desiring to recline, the occupant may reposition (1) the seatback 22 into a reclined position relative to the seat-base 18, (2) the upper thoracic support 26 into the deployed position, and (3) the actuatable comfort feature 34 into the extended position, as shown in FIG. 7B.

Use of the present disclosure may provide a variety of advantages. First, the stowable nature of the upper thoracic support 26 and the retractable nature of the actuatable comfort feature 34 enable a seat occupant to avoid potentially uncomfortable protrusions from the seatback 22 while the seatback 22 is in the upright position. Second, the deployable nature of the upper thoracic support 26 combined with the extendable nature of the actuatable comfort feature 34 may provide the occupant with comfort while the seatback 22 is in the reclined position, by supporting and cushioning the reclining occupant's thorax.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seating assembly, comprising:
   a seat-base; and
   a seatback pivotally coupled to the seat-base, comprising:
      a seatback frame;
      an upper thoracic support operably coupled to the seatback frame and configured to move outward from the seatback frame from a stowed position to a deployed position; and
      an actuatable comfort feature coupled to the upper thoracic support and configured to extend outward from the upper thoracic support from a retracted position to an extended position, wherein moving the upper thoracic support from the stowed position to the deployed position prompts the actuatable comfort feature to extend from the retracted to the extended position.

2. The vehicle seating assembly of claim 1, wherein the actuatable comfort feature is coupled to the upper thoracic support such that the actuatable comfort feature is configured to move from the retracted position to the extended position as the upper thoracic support moves from the stowed position to the deployed position.

3. The vehicle seating assembly of claim 1, wherein the actuatable comfort feature is configured to protrude outward from the upper thoracic support a first distance while in the retracted position and a second distance while in the extended position, wherein the second distance is greater than the first distance.

4. The vehicle seating assembly of claim 1, wherein the actuatable comfort feature comprises:
   a flexible member configured to be generally flat while in the retracted position and generally bowed while in the extended position.

5. The vehicle seating assembly of claim 4, wherein the flexible member comprises: a plastic sheet.

6. The vehicle seating assembly of claim 1, wherein the upper thoracic support is pivotally coupled to the seatback frame and configured to pivot outward from the seatback frame from the stowed position to the deployed position.

7. The vehicle seating assembly of claim 6, wherein the upper thoracic support is configured to pivot toward the seat-base as the upper thoracic support moves from the stowed position to the deployed position.

8. A vehicle seating assembly, comprising:
   a seat-base; and
   a seatback pivotally coupled to the seat-base, wherein the seatback comprises:
      a seatback frame;
      an upper thoracic support coupled to the seatback frame and operable to pivot toward the seat-base from a stowed position to a deployed position; and
      an actuatable comfort feature coupled to the upper thoracic support and configured to extend outward therefrom from a retracted position to an extended position, wherein moving the upper thoracic support from the stowed position to the deployed position prompts the actuatable comfort feature to extend from the retracted to the extended position.

9. The vehicle seating assembly of claim 8, wherein the actuatable comfort feature is coupled to the upper thoracic support such that the actuatable comfort feature is configured to move from the retracted position to the extended position as the upper thoracic support pivots from the stowed position to the deployed position.

10. The vehicle seating assembly of claim 9, wherein the actuatable comfort feature is configured to protrude outward from the upper thoracic support a first distance while in the retracted position and a second distance while in the extended position, wherein the second distance is greater than the first distance.

11. The vehicle seating assembly of claim 8, wherein the actuatable comfort feature comprises:
   a flexible member configured to be generally flat while in the retracted position and generally bowed while in the extended position.

12. The vehicle seating assembly of claim 11, wherein the flexible member comprises: a plastic sheet.

13. The vehicle seating assembly of claim 8, wherein the actuatable comfort feature comprises:
   a bladder configured to expand from the retracted position to the extended position.

14. A vehicle seating assembly, comprising:
   a seatback frame;
   an upper thoracic support pivotally coupled to the seatback frame and operable between stowed and deployed positions;
   a gap defined between the upper thoracic support and the seatback frame that enlarges when the upper thoracic support moves from the stowed position to the deployed position; and
   an actuatable comfort feature coupled to the upper thoracic support and operable between a retracted position and an extended position, wherein moving the upper thoracic support from the stowed position to the deployed position prompts the actuatable comfort feature to extend from the retracted to the extended position.

15. The vehicle seating assembly of claim 14, wherein the actuatable comfort feature is coupled to the upper thoracic support such that the actuatable comfort feature is configured to move from the retracted position to the extended position as the upper thoracic support pivots from the stowed position to the deployed position.

16. The vehicle seating assembly of claim 14, wherein the actuatable comfort feature is configured to protrude outward from the upper thoracic support a first distance while in the retracted position and a second distance while in the extended position, wherein the second distance is greater than the first distance.

17. The vehicle seating assembly of claim 14, wherein the actuatable comfort feature comprises:
   a flexible member configured to be generally flat while in the retracted position and generally bowed while in the extended position.

18. The vehicle seating assembly of claim 17, wherein the flexible member comprises: a plastic sheet.

19. The vehicle seating assembly of claim 14, wherein the actuatable comfort feature comprises:
   a bladder configured to expand from the retracted position to the extended position.

20. The vehicle seating assembly of claim 14, wherein the seatback frame further comprises: a mid-portion, and the upper thoracic support is pivotally coupled to the mid-portion.

* * * * *